United States Patent
Veto et al.

(10) Patent No.: US 10,605,409 B2
(45) Date of Patent: Mar. 31, 2020

(54) ADDITIVELY MANUFACTURED PRESSURIZATION DIFFUSERS

(71) Applicant: The Boeing Company, Chicago, IL (US)

(72) Inventors: Christopher C. Veto, Chicago, IL (US); Martin E. Lozano, Chicago, IL (US); Victor John Barackman, Chicago, IL (US); Gary D Grayson, Chicago, IL (US); Scott K Oechsle, Chicago, IL (US); Alfredo Lopez, Chicago, IL (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 15/640,217

(22) Filed: Jun. 30, 2017

(65) Prior Publication Data

US 2019/0003646 A1 Jan. 3, 2019

(51) Int. Cl.
*F17C 5/06* (2006.01)
*B05B 1/00* (2006.01)
*B64D 1/00* (2006.01)

(52) U.S. Cl.
CPC ............... *F17C 5/06* (2013.01); *B05B 1/005* (2013.01); *B64D 1/00* (2013.01);
(Continued)

(58) Field of Classification Search
CPC ............... F17C 5/06; F17C 2270/0197; F17C 2260/02; F17C 2205/0302;
(Continued)

(56) References Cited

U.S. PATENT DOCUMENTS 1,718,698 A * 6/1929 Lowe .................. A62C 35/605
169/27
2,538,492 A * 1/1951 Anderson .......... B61D 27/0063
126/93
(Continued)

OTHER PUBLICATIONS

Stephens, Jonathan R., Cryogenic Propellant Tank Sub-Surface Pressurization with Bang-Bang Control, eCryo Industry Workshop. 2016.
(Continued)

*Primary Examiner* — Arthur O. Hall
*Assistant Examiner* — Steven M Cernoch
(74) *Attorney, Agent, or Firm* — McDonnell Boehnen Hulbert & Berghoff LLP

(57) ABSTRACT

Example implementations relate to Additive Manufacturing (AM) pressurization diffusers. An example diffuser includes an integral component configurable for receiving and diffusing pressurant. Particularly, the integral component includes multiple elements manufactured as a single-piece structure, including an inner filter, outer shell, and flange. The inner filter includes micro-diamond holes that enable pressurant received at an opening of the inner filter to diffuse out of the inner filter and subsequently through holes positioned in a shell surface of the outer shell. The flange can position the diffuser such that the opening of the inner filter is in pressurant communication with a pressurant source (e.g., opening of a tank) enabling the diffuser to receive and diffuse pressurant in a predefined pattern. For example, when the diffuser is positioned inside a tank, the diffuser can have a frustum configuration that helps diffuse pressurant upwards towards inner sidewalls of a pressure vessel, tube or channel.

20 Claims, 5 Drawing Sheets

(52) U.S. Cl.
CPC ............... *F17C 2205/0302* (2013.01); *F17C 2225/044* (2013.01); *F17C 2260/02* (2013.01); *F17C 2270/0189* (2013.01); *F17C 2270/0197* (2013.01)

(58) Field of Classification Search
CPC ....... F17C 2225/044; F17C 2270/0189; B05B 1/005; A62C 3/002; B01D 29/23; B01D 29/58; B01D 35/023; B01D 35/027; B01D 35/0276; B64D 1/00
USPC ..... 169/30, 71–89, 66, 67; 239/DIG. 4, 590, 239/590.3, 590.5; 210/172.1, 172.6
See application file for complete search history.

(56) References Cited

U.S. PATENT DOCUMENTS

| | | | | |
|---|---|---|---|---|
| 3,202,160 | A * | 8/1965 | Barger | B64G 1/402 137/1 |
| 3,687,375 | A * | 8/1972 | Griffiths | F02M 61/02 239/557 |
| 4,113,050 | A * | 9/1978 | Smith | F01N 1/083 138/41 |
| 4,387,854 | A * | 6/1983 | Dupont | A61H 33/026 137/541 |
| 4,595,398 | A * | 6/1986 | Orton | B64G 1/402 96/187 |
| 4,715,399 | A * | 12/1987 | Jaekle, Jr. | B64G 1/402 137/209 |
| 4,901,762 | A * | 2/1990 | Miller, Jr. | B64G 1/402 137/574 |
| 5,279,323 | A * | 1/1994 | Grove | F17C 9/00 137/154 |
| 5,542,704 | A * | 8/1996 | Hamilton | B60R 21/2644 149/36 |
| 5,582,742 | A * | 12/1996 | Wilkie | B04B 11/06 210/360.1 |
| 5,660,236 | A * | 8/1997 | Sears | A62C 13/22 169/33 |
| 5,820,160 | A * | 10/1998 | Johnson | B60R 21/30 280/736 |
| 5,845,933 | A * | 12/1998 | Walker | B60R 21/2644 280/741 |
| 5,985,060 | A * | 11/1999 | Cabrera | C06D 5/06 149/62 |
| 6,123,359 | A * | 9/2000 | Cabrera | B01D 39/10 149/36 |
| 6,196,583 | B1 * | 3/2001 | Ruckdeschel | B60R 21/264 280/736 |
| 6,257,341 | B1 * | 7/2001 | Bennett | A62C 5/006 169/85 |
| 6,371,213 | B1 * | 4/2002 | Smith | A62C 3/0292 169/33 |
| 7,059,633 | B2 * | 6/2006 | Wang | B60R 21/272 222/5 |
| 7,455,120 | B2 * | 11/2008 | Richardson | A62C 5/006 169/12 |
| 7,506,824 | B2 * | 3/2009 | Nau | B05B 7/0012 123/470 |
| 7,770,924 | B2 * | 8/2010 | Cox | B60R 21/264 102/530 |
| 7,784,556 | B2 * | 8/2010 | Richardson | A62C 5/006 169/12 |
| 7,866,141 | B2 * | 1/2011 | Le Docte | F02K 1/822 181/220 |
| 7,896,121 | B2 * | 3/2011 | Thompson | A62C 3/07 137/351 |
| 8,162,350 | B1 * | 4/2012 | Parkinson | A62C 5/006 280/741 |
| 8,202,357 | B2 * | 6/2012 | Behruzi | F02K 9/605 96/204 |
| 8,413,732 | B2 * | 4/2013 | Richardson | A62C 35/02 169/28 |
| 8,672,348 | B2 * | 3/2014 | Robbins | F42B 3/04 149/2 |
| 8,939,225 | B2 * | 1/2015 | Cox | A62C 5/006 169/72 |
| 8,967,284 | B2 * | 3/2015 | Sampson | A62C 5/006 169/44 |
| 2004/0216903 | A1 * | 11/2004 | Wierenga | A62C 35/023 169/85 |
| 2008/0135266 | A1 * | 6/2008 | Richardson | A62C 99/0018 169/46 |
| 2017/0341003 | A1 * | 11/2017 | Smith | B01D 46/2403 |

OTHER PUBLICATIONS

Harlow, and Nakayama. Transport of Turbulence Energy Decay Rate. Linthicum Heights, Md.: NASA Center for AeroSpace Information, 1990. Print.
Rodi, Wolfgang. Turbulence Models. The Netherlands: International Association for Hydraulic Research, 1984. Print.
Yakhot, and Orszag. "Renormalization Group Analysis of Turbulence. I. Basic Theory." Journal of Scientific Computing. 1.1 (1986): 3-51. Print.
Yakhot and Smith. "The Renormalization Group, the $\xi$-Expansion and Derivation of Turbulence Models." Journal of Scientific Computing. 7.1 (1992): 35-61. Print.
Wilcox, David C. "Reassessment of the Scale-Determining Equation for Advanced Turbulence Models." AIAA Journal. 26.11 (1988): 1299-1310. Print.
Wilcox, David C. "Turbulence Modeling for CFD." La Canada, Calif: DCW Industries, 1998. Print.
Wilcox, David C. "Formulation of the K Omega Turbulence Model Revisited." AIAA Journal. 46.11. (2008): 2823-2847. Print.
Kolmogorov, A N. 1942 Equations of Turbulent Motion of an Incompressible Fluid Izv. Akad. Nauk SSSR.

* cited by examiner

ADDITIVELY MANUFACTURED PRESSURIZATION DIFFUSERS

STATEMENT OF GOVERNMENT INTEREST

This invention was made with Government support under HR0011-14-9-0005 awarded by Defense Advanced Research Projects Agency. The government has certain rights in this invention.

FIELD

The present disclosure relates generally to tank pressurization diffusers and hydraulic components, and more particularly to Additive Manufactured (AM) tank pressurization diffusers configurable for receiving and diffusing pressurant within a pressurant tank or other type of apparatus.

BACKGROUND

Propellant tanks are pressure vessels configured to store pressurant, such as liquid fuel, liquid oxidizer, or other chemical substances used to propel a vehicle. For example, rockets and aircrafts may rely upon stored pressurant to generate propulsive thrust to enable flight. Efficient use of pressurant is important for various reasons, including the cost and weight associated with the pressurant. Therefore, measures are often taken to improve pressurant expulsion efficiency.

One measure aimed to improve pressurant delivery involves using a tank pressurization diffuser that can reduce undesirable mixing of tank ullage gas or vapor with the liquid pressurant in a tank. In particular, a diffuser can be configured to passively introduce a pressurizing gas or vapor (also simply referred to as pressurant) directly into the upper region of a liquid propellant tank in such a manner as to reduce the velocity of the vapor or gas to prevent inadvertent mixing with the liquid pressurant already stored within the tank. The diffuser can be designed with the goal of limiting or eliminating direct impingement of the pressurant with the liquid propellant to decrease the heat transfer between the pressurant and liquid surface to ensure optimum expulsion and pressurization efficiency.

Existing diffusers are historically assembled from multiple components, such as screens or perforated components including machined parts that are attached together via mechanical fasteners (e.g., screws, bolts, and rivets) or by brazing or welding. The multiple component configuration of the diffuser, however, can result in vibrational, fatigue, and other operational problems that could impact performance. The multiple-component configuration also requires individually manufacturing each component prior to assembly which consumes additional touch labor time and adds additional expense. Furthermore, since the parts must be assembled together using simple shapes (flat surfaces for example), the complexity of the diffuser's design is often limited by traditional manufacturing processes, which can then limit the capabilities and performance of the diffuser. Thus, there is a need for a non-conventional diffuser design and manufacturing process that is capable of receiving and passively (in traditional use) redirecting pressurant in a manner that effectively reduces unwanted mixing of pressurant within a tank while also avoiding the limitations of traditional, multiple-component diffusers.

SUMMARY

In one example, an apparatus is described comprising an integral component configurable for receiving and diffusing pressurant. The integral component includes an outer shell having a shell surface positioned between a first end and a second end. In some instances, the shell surface includes a first plurality of holes. The integral component also includes an inner filter positioned inside the outer shell. Particularly, a first end of the inner filter extends through an opening in the first end of the outer shell and includes an opening for receiving pressurant. In addition, a second end of the inner filter is coupled to the second end of the outer shell. As such, the inner filter includes a second plurality of holes positioned between the first end and the second end of the inner filter such that pressurant received via the opening at the first end of the inner filter diffuses through the second plurality of holes and subsequently through the first plurality of holes in the shell surface of the outer shell. The integral component also includes a flange coupled to the first end of the inner filter. Particularly, the flange is configurable for coupling the apparatus such that the opening at the first end of the inner filter is in pressurant communication with a pressurant source.

In another example, a tank is described comprising an integral component extending toward a center of the tank from an inner surface of the tank. The integral component is configurable for receiving and diffusing pressurant. Particularly, the integral component includes an outer shell having a shell surface positioned between a first end and a second end. The shell surface includes a first plurality of holes. The integral component also includes an inner filter positioned inside the outer shell. A first end of the inner filter extends through an opening in the first end of the outer shell and includes an opening that is in pressurant communication with an opening of the tank. A second end of the inner filter is coupled to the second end of the outer shell. The inner filter includes a second plurality of holes positioned between the first end and the second end such that pressurant received via the opening at the first end of the inner filter diffuses through the second plurality of holes and subsequently through the first plurality of holes in the shell surface of the outer shell.

In another example, a method is described. The method includes receiving pressurant at an inner filter of an integral component. Particularly, the pressurant is received via an opening at a first end of the inner filter, and the integral component is configurable for receiving and diffusing the pressurant and includes an outer shell positioned around the inner filter. The outer shell includes a shell surface having a first plurality of holes positioned between a first end and a second end of the outer shell. The method also includes diffusing the pressurant received at the opening at the first end of the inner filter from the integral component. In particular, diffusing the pressurant from the integral component involves initially diffusing the pressurant from the inner filter through a second plurality of holes positioned in the inner filter between the first end and a second end of the inner filter, and subsequently diffusing the pressurant through the first plurality of holes in the shell surface of the outer shell.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example implementations relate to pressurization diffusers capable of receiving and diffusing pressurant in a predefined pattern. Particularly, some examples involve additively manufactured diffusers that are designed and created in a manner that all elements of a diffuser are intraconnected as a single-piece structure without requiring any assembly. Unlike existing diffusers assembled using multiple components, an additively manufactured diffuser is created using a layer-upon-layer generation process that enables the various elements of the diffuser to be generated together as an integral component.

Similar to a multiple-component diffuser, the Additively Manufactured (AM) diffuser can passively receive and diffuse pressurant in a predefined pattern. For example, an additively manufactured diffuser can be positioned inside a tank near the opening of the tank such that the incoming pressurant received at the tank is passively redirected by the diffuser away from the liquid propellant surface of the tank. Redirection of the incoming pressurant helps prevent the pressurant from directly impinging and chaotically mixing with other liquid propellant already positioned within the tank. In particular, the diffuser can be designed to reduce the associated velocity and heat transfer of the incoming pressurant enabling the pressurant to gently settle into the other contents (e.g., propellant) occupying the tank. As a result, the diffuser can help improve the use and expulsion efficiency of the pressurant.

In addition, the single-piece intraconnected structure of an additively manufactured diffuser can perform more effectively than multiple-component diffusers. Particularly, the intraconnected structure reduces vibration and fatigue issues that often impact the performance of multiple-component diffusers, as well as enables fine-tuning of structural geometry or tailoring of resonant modal frequencies. Further, Additive Manufacturing (AM) also allows a diffuser to have a complex design with design aspects that can improve performance since the layer-upon-layer generation process eliminates the need to independently manufacture components that must be assembled together.

Figure 1:
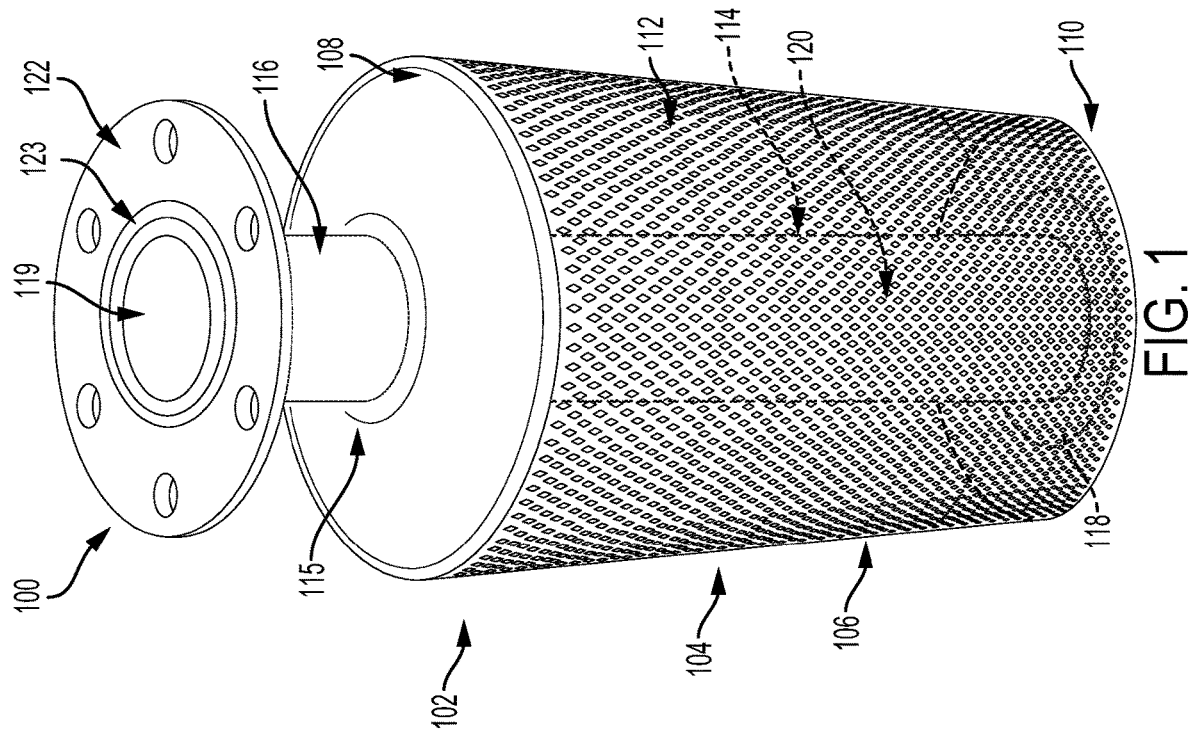
FIG. 1 is an illustration of an apparatus, according to an example implementation.

Referring now to the Figures, FIG. 1 is an illustration of an apparatus 100, according to an example implementation. The apparatus 100 is an example diffuser that includes an integral component 102 configurable for receiving and diffusing pressurant. As shown in FIG. 1, the integral component 102 consists of intraconnected elements making up the apparatus 100, including an outer shell 104, an inner filter 114, and a flange 122. Additional configurations are described below.

The apparatus 100 can passively redirect pressurant by adjusting the entry flow pattern of the pressurant. In some example applications, the apparatus 100 is positioned within a tank nearby the opening of the tank to enable the apparatus 100 to passively receive and redirect incoming pressurant away from the liquid propellant surface and perhaps toward one or more inner sidewalls of the tank. The passive redirection of the pressurant away from the liquid surface and perhaps towards inner sidewalls of the tank helps prevent the pressurant from forcefully mixing with liquid propellant already occupying the tank. As a result, the apparatus 100 can improve expulsion efficiency and use of the pressurant.

Unlike diffusers assembled from multiple components, the apparatus 100 involves multiple elements intraconnected as a single-piece structure. Particularly, Additive Manufacturing (AM) enables the apparatus 100 and other physical objects to be created as intraconnected single-piece structure through the use of a layer-upon-layer generation process. Additive Manufacturing (AM) involves depositing a physical object in one or more selected materials based on a design of the object. For example, Additive Manufacturing (AM) can generate the apparatus 100 using a Computer Aided Design (CAD) of the apparatus 100 as instructions. As a result, changes to the design of the apparatus 100 can be immediately carried out in subsequent physical creations of the apparatus 100. This enables the apparatus 100 to be easily adjusted or scaled to fit different types of applications (e.g., for use in various tank sizes).

The layer-upon-layer process utilized in Additive Manufacturing (AM) enables the creation of the apparatus 100 to have all elements (e.g., the inner filter 114, the outer shell 104, the flange 122) intraconnected to form the integral component 102. As a result, the apparatus 100 does not require screws, bolts, or other types of fasteners to connect and stabilize elements, and thus does not include any unwanted gaps or diversity of tolerances that can occur between connections. Rather, the single-piece structure of the apparatus 100 can perform passive pressurant redirection without subjecting the apparatus 100 to vibrational and fatigue issues that often impact multiple-component diffusers.

Additionally, the layer-upon-layer generation process also can deposit the apparatus 100 with complex designs that might not be possible for diffusers assembled with multiple components. In turn, the design of the apparatus 100 can include aspects that aim to improve overall operation. For example, the design can incorporate physical elements that help redirect incoming pressurant in a desired manner that multiple-component diffusers might not be able to replicate.

Additive Manufacturing (AM) also enables depositing the apparatus 100 in a variety of materials. For instance, in some examples, the apparatus 100 is deposited using nickel-chromium-based super alloys (e.g., Inconel 625 for ductility in cryogenic environments and durability in high-temperature environments) or other materials that are resistant to corrosions. Inconel 625 comprises nickel and resists oxidation, remains ductile at cryogenic temperatures, and remains strong at high temperatures. As such, Inconel 625 is a viable option for the apparatus 100 to enable the apparatus 100 to maintain strength after numerous uses. In other examples, other materials are used.

In another example implementation, the apparatus 100 is generated using a combination of different materials. The apparatus 100 can have some layers that are created using a first type of material and other layers that are created using a second type of material. In addition, various processes are used in other examples to produce the apparatus 100. These processes are included in table 1.

TABLE 1

| | |
|---|---|
| DEP | Direct Energy Deposition |
| DMLS | Direct Metal Laser Sintering |
| DMP | Direct Metal Printing |
| EBAM | Electron Beam Additive Manufacturing |
| EBM | Electron Beam Leting |
| EBPD | Electron Beam Powder Bed |
| FDM | Fused Deposition Modeling |
| IPD | Indirect Power Bed |
| LCT | Laser Cladding Technology |
| LDT | Laser Deposition Technology |
| LDW | Laser Deposition Welding |
| LDWM | Laser Deposition Welding with integrated Milling |
| LENS | Laser Engineering Net Shape |
| LFMT | Laser Freeform Manufacturing Technology |
| LMD-p | Laser Metal Deposition-powder |
| LMD-w | Laser Metal Deposition-wire |
| LPB | Laser Powder Bed |
| LPD | Laser Puddle Deposition |
| LRT | Laser Repair Technology |
| PDED | Powder Directed Energy Deposition |
| SLA | Stereolithography |
| SLM | Selective Laser Melting |
| SLS | Selective Laser Sintering |
| SPD | Small Puddle Deposition |

In some example implementations, the apparatus 100 is generated using melt-away support materials, such as sulfone, thermoplastic, polyester, organic composite photoresist materials and dry film resists. Particularly, during the layer-upon-layer generation process, a melt-away support material can support elements of the apparatus 100 until the apparatus 100 is complete and stable enough to standalone. In turn, the melt-away support material can support physical aspects of the apparatus 100 during the layer-upon-layer generation process until the apparatus 100 is completed. After the apparatus 100 is completed, the melt-away support material can be removed to leave only the apparatus 100 remaining. For instance, a water soluble melt-away support material can rinse away from portions of the apparatus 100.

In an example implementation, the apparatus 100 is constructed using one or more elastic materials. Elastic materials can enable the apparatus 100 to be compressed and expanded during operation. Quasi-elastic materials can similarly be used to create the apparatus 100. For example, when the apparatus 100 is deposited using quasi-elastic materials, the apparatus 100 can be stowed in a low-volume configuration and subsequently expanded for use. As such, the apparatus 100 may be configured for uses beyond passive flow control, including deployment of diffuser for use and/or deformation of diffuser during use, as needed for myriad functional needs, gradients of flow rates, or various environmental conditions in various regimes during the operation envelope of flight.

The integral component 102 of the apparatus 100 includes intraconnected elements enabling the integral component 102 to receive and diffuse pressurant in a predefined manner. The different elements are intraconnected as a single-piece structure.

The outer shell 104 of the integral component 102 is configured with a shell surface 106 positioned between a first end 108 and a second end 110. The first end 108 and the second end 110 are shown with circular configurations, but can have other suitable configurations (e.g., octagonal, hexagonal, pentagonal, rectangular, triangular, or the like). Additionally, in some examples, the shape of the first end 108 can differ from the shape of the second end 110 (e.g., the first end 108 is circular and the second end 110 is octagonal). In some examples, both ends may have the same shape with the same major and minor diameters.

As shown in the illustration of FIG. 1, the first end 108 of the outer shell 104 has a greater circumference than the second end 110 of the outer shell 104. The size difference results in the outer shell 104 forming a frustum configuration that can help direct the flow of pressurant, and therefore heat, dispersed from the apparatus 100 upwards in a direction out and/or away from the second end 110. The frustum design of the outer shell 104 helps direct pressurant in an upward manner away from the liquid propellant surface. In other examples, the outer shell 104 can have other configurations designed to direct flow of pressurant as desired. For instance, the outer shell 104 can have a bell pepper or cylindrical configuration in example implementations.

Additionally, in the example implementation, a portion of the first end 108 of the outer shell 104 curves inward towards the second end 110 of the outer shell 104. Similarly, the second end 110 of the outer shell 104 includes a portion that curves inwards towards the first end 108 of the outer shell 104. The curvature in the first end 108 and the second end 110 can help direct diffused pressurant as desired. In other examples, the first end 108 and the second end 110 can have more or less curvature. For instance, one or both of the first end 108 and the second end 110 can have a flat design. In instances where melt-away material is not used, the second end 110 can exhibit sloped ceilings away from both inner and outer shells to enable layer-by-layer deposition without use of break-away supports, as such supports might be trapped in the internal volume.

Within examples, adjusting the parameters of the first end 108 and the second end 110 can modify the outer shell 104 to alter the output of the apparatus 100. For instance, the perimeters of the first end 108 and the second end 110 can vary in size, thickness, or other parameters within examples. For example, in another example implementation, the first end 108 of the outer shell 104 can have a first shape configuration and the second end 110 can have a second shape configuration that differs from the configuration of the first end 108. As such, the perimeters of the first end 108 and the second 110 can also differ or equal in size to adjust the configuration of the shell surface 106.

Additionally, the thickness of the shell surface 106 can also vary within example implementations. For instance, the shell surface 106 can have a uniform thickness in some examples. In other examples, portions of the shell surface 106 can vary in thickness. For example, an upper portion of the shell surface 106 located near the first end 108 of the outer shell 104 can have a different thickness than a portion of the shell surface 106 located near the second end 110 of the outer shell 104. The variations in the thickness of the shell surface 106 can impact the flow pattern for diffusing incoming pressurant.

In some implementations, the outer shell 104 can include one or more lips, plates, scales, flaps, or other structural aspects to assist in directing pressurant leaving the apparatus 100. For example, the outer shell 104 can include one or more flaps that help direct the pressurant away from the liquid propellant towards inner sidewalls of a tank. In some instances, the physical aspects added to the outer shell 104 need to adhere to build limitations associated with Additive Manufacturing (AM) (e.g., a 37-53 degree build limitation).

In some examples, the second end 110 of the outer shell 104 can include a lip that extends around a perimeter of the second end 110. The lip can cause pressurant diffused from the inner filter 114 to diffuse radially outward and at an upward angle generally toward the first end 108 and/or away from the send end 110, from the integral component 102.

Flaps, lips, and other physical aspects, however, can have other configurations when melt-away support material is used to support the design of the apparatus 100 during the Additive Manufacturing (AM) process. For example, scales or other structural aspects of the outer shell 104 can have bends, kinks, or other modifications to set the aspects into desired positions. For example, scales positioned on the outer shell 104 can include scalloped trailing edges similar to the configuration of edges on a fir cone from the Douglas-Fir.

As shown in FIG. 1, the shell surface 106 of the outer shell 104 includes a first plurality of holes 112 that enable pressurant received to disperse from the apparatus 100. In particular, the positions and configurations of the holes 112 can impact the redirection pattern for pressurant diffusing from the apparatus 100. As such, in some examples, the positions and configurations of the holes 112 in the shell surface 106 are optimized based on the sub-sonic and sonic orifice cross-sectional areas that exist between the outer shell 104 and the inner filter 114 and within the inner filter 114, respectively. As an example, the size of each hole in either shell may be determined by sizing the total cross-sectional feed-through area, based on fluid-flow equations, and then dividing by the quantity of holes, noting that some manufacturing restrictions may limit the quantity of holes (e.g., minimum wall-thickness and minimum hole size).

The sonic orifices are used to choke the pressurant at the design flow rate at given inlet pressure and temperature conditions. The Sonic flow equation provides the flow rate given the total summation of the choked effective area also known as $C_dA$. The subsonic orifices on the outer shell are used to further diffuse the pressurant velocity to subsonic velocities while entering the propellant tank. Reducing the velocity to subsonic conditions help reduce the heat transfer between the pressurant and liquid surface thereby increasing propellant expulsion efficiency.

In some examples, the holes 112 in the shell surface 106 can each be shaped in a diamond configuration. The diamond configuration enables depositing the holes 112 using Additive Manufacturing (AM) while also enabling the outer shell 104 to maintain structural strength. In some configurations, the diamond-shaped holes 112 can include filleted corners to mitigate stress-fracture promulgation as a product of stress-focusing.

In other examples, the holes 112 in the shell surface 106 can have other shapes, such as a teardrop configuration or hexagonal configuration. For example, the holes 112 can have a micro-nozzle configuration, converging-diverging, diverging, and/or converging shape that can compress or expand pressurant as the pressurant diffuses (or effuses) through.

In some examples, the shell surface 106 can have multiple-shaped holes 112. For instance, a first set of the holes 112 in the shell surface 106 can have a first configuration (e.g., diamond) and a second set of the holes 112 can have a second configuration (e.g., teardrop). In addition, the holes 112 can be arranged in a uniform or non-uniform manner depending on desired flow paths for dispersed pressurant. For example, the shell surface 106 can involve a mosaic of diamond, hexagonal, parallelogram, trapezoidal, trapezium, and/or other shaped holes 112 with some portions of the shell surface 106 lacking holes as well. In some implementations, the entire outer shell 104 may be solid with only one exit hole, flange, or spigot, such that the apparatus 100 can serve as a filter.

The holes 112 in the shell surface 106 of the outer shell 104 can also be sized based on the sub-sonic flow equation shown in equation [1]. In equation [1], $P_1$ represents the pressure between the inner filter 114 and the outer shell 104, and $P_2$ represents the pressure that exists just outside the holes 112 in the shell surface 106 of the outer shell 104.

$$\dot{m} = P_0 A M \sqrt{\frac{2g_c\gamma}{(\gamma-1)RT}\left[\left(\frac{P_2}{P_1}\right)^{\frac{2}{\gamma}} - \left(\frac{P_2}{P_1}\right)^{\frac{\gamma+1}{\gamma}}\right]} \quad [1]$$

In equation [1], $\dot{m}$ is the mass flow rate $P_0$ is the upstream total pressure, A is the area, M is Mach number, $g_c$ is the acceleration of gravity, $\gamma$ is the specific heat ratio, R is the gas constant, T is the temperature, $P_1$ is the pressure between the inner cylinder and the outer shell, and $P_2$ is the pressure just outside the diamond-pattern holes of the outer shell.

The integral component 102 also includes an inner filter 114 positioned inside the outer shell 104. The inner filter 114 is the element of the apparatus 100 that is positioned to initially receive and diffuse incoming pressurant. Particularly, a first end 116 of the inner filter 114 extends through an opening 115 in the first end 108 of the outer shell 104 and includes an opening 119 for receiving the incoming pressurant.

As such, the inner filter 114 includes a second plurality of holes 120 positioned between the first end 116 and a second end 118, which may also include a variety or mosaic of shapes from diamond to hexagonal to teardrop, etc. In some example implementations, the second plurality of holes 120 are positioned between the first end 108 of the outer shell 104 and the second end 118 of the inner filter 114.

The holes 120 in the inner filter 114 allow pressurant received at the opening 119 in the first end 116 to diffuse out from the inner filter 114 into the area positioned between the inner filter 114 and the outer shell 104. Particularly, in some implementations, the area between the inner filter 114 and the outer shell 104 can differ depending on the desired flow pattern for dispersing pressurant from the apparatus 100. For instance, in some examples, the distance between the inner filter 114 and the outer shell 104 is based on a desired mass flow rate for the integral component 102. The volume that exists between the inner filter 114 and the outer shell 104 may depend on the total surface area of the shell surface 106. The volume can also depend on geometrically tuning the diffuser so as to avoid sensitive, resonant frequency mods.

The volume may also be tailored so as to increase or decrease mixing between shells.

As shown in FIG. 1, the second end 118 of the inner filter 114 is coupled to the second end 110 of the outer shell 104. Particularly, the second end 110 of the outer shell 104 encloses the second end 118 of the inner filter 114 to prevent pressurant from flowing out at the second end 118 of the inner filter 114. As a result, the inner filter 114 and other elements of the apparatus 100 can redirect the flow of pressurant away from the liquid propellant and towards inner sidewalls or the ceiling of the tank via the shape and position of elements of the apparatus 100. In some examples, the second end 118 of the inner filter 114 is enclosed during the Additive Manufacturing (AM) layer-upon-layer generation process.

In some examples, the length between the first end 116 and the second end 118 of the inner filter 114 is selected based on a desired mass flow rate for the inner filter 114. The desired mass flow rate represents the mass of pressurant that flows through holes 120 in the inner filter 114 per unit of time. When the inner filter 114 is longer, and/or has greater cross-sectional area, more pressurant can flow through the holes 120 to disperse from the inner filter 114. The thickness of portions of the inner filter 114 as well as other parameters (e.g., sizes of the holes 120) can alter the dispersion of pressurant from the inner filter 114 as well as from the apparatus 100 overall.

Further, in some examples, the orifice area of the inner filter 114 is designed for choked flow equations such that equation [2] applies. For example, in some cases, the cross-sectional area of the inner filter 114 is based on desired choked flow conditions for the integral component 102.

$$\dot{m} = C_D A P_O \sqrt{\frac{g}{zRT} \gamma \left(\frac{2}{\gamma+1}\right)^{\frac{\gamma+1}{\gamma-1}}} \quad [2]$$

In equation [2], $C_D$ is the discharge coefficient, z is the compressibility factor and all other variables are described above with regards to equation [1].

Choked flow is a fluid dynamic condition associated with the compressible gas dynamics. Particularly, when pressurant at a given pressure and temperature passes through a restriction (e.g., the holes in the inner filter 114) into a lower pressure environment, the velocity of the pressurant decreases. At initially subsonic upstream conditions, the conservation of mass principle requires the pressurant velocity to increase as it flows through the smaller cross-sectional area of the holes 120 in the inner filter 114. The venturi effect causes the static pressure and density to wane downstream beyond the holes 120 in the inner filter 114. Choked flow represents a limiting condition where the mass flow of the pressurant will not increase with a further wane in the downstream pressure environment while upstream pressure is fixed.

The mass flow rate is approximated for LO2 wherein equation [3] applies.

$$\dot{m}_{O2} = \frac{0.559 C_D A P_O}{\sqrt{T_O}} \quad [3]$$

The mass flow rate is approximated for LH2 as shown in equation [4].

$$\dot{m}_{H2} = \frac{0.14 C_D A P_O}{\sqrt{T_O}} \quad [4]$$

In equation [4], $\dot{m}$ is the mass flow rate, $C_D$ is the discharge coefficient, A is the area, $P_o$ is the upstream total pressure. The compressible flow equation may be re-expressed in terms of Mach number at the diffuser inlet as shown in equation [5].

$$\dot{m} = P_O A M \sqrt{\frac{\gamma g_c}{RT_O}} \frac{1}{\left(1 + \frac{\gamma-1}{2}M^2\right)^{\left(\frac{\gamma+1}{2(\gamma-1)}\right)}} \quad [5]$$

As indicated above, the inner filter 114 includes the holes 120 that enable pressurant received via the opening 119 at the first end 116 of the inner filter 114 to diffuse out of the inner filter 114 and subsequently through the holes 112 in the shell surface 106 of the outer shell 104. As such, the position and configuration of holes 120 in the inner filter 114 can vary within examples. As shown, the holes 120 in the inner filter 114 have pin-shapes (or rather, small diamond-shapes). In some implementations, the holes 112 in the shell surface 106 of the outer shell 104 are larger than the respective holes 120 in the inner filter 114.

In a further example implementation, the inner filter 114 can be manufactured without other elements of the apparatus 100. As a standalone structure, the inner filter 114 can be used in other applications, such as a hydraulic filter. Other applications for the AM filter beyond aerospace can include a sieve and/or a colander.

The integral component 102 also includes a flange 122 coupled to the first end of the inner filter 114. The flange 122 is configurable for coupling the apparatus such that the opening 119 at the first end 116 of the inner filter 114 is in pressurant communication with a pressurant source (e.g., gas source). For instance, in some examples, the flange 122 connects the apparatus 100 near the curved dome of a tank such that the apparatus 100 can disperse pressurant away from the propellant liquid surface out towards the sidewalls of the tank.

Within examples, parameters of the flange 122 can vary. For instance, in an example implementation, the flange 122 has a sinusoidal configuration or rectangular configuration. In addition, the flange 122 is further shown with a groove 123 configured with a circular shape, but can have other configurations (e.g., octagonal, pentagonal, etc.). The groove 123 can enable a seal to be placed in the flange 122 to prevent unwanted leakage and can house an o-ring. In some examples, the flange 122 can include multiple grooves 123.

Figure 2:
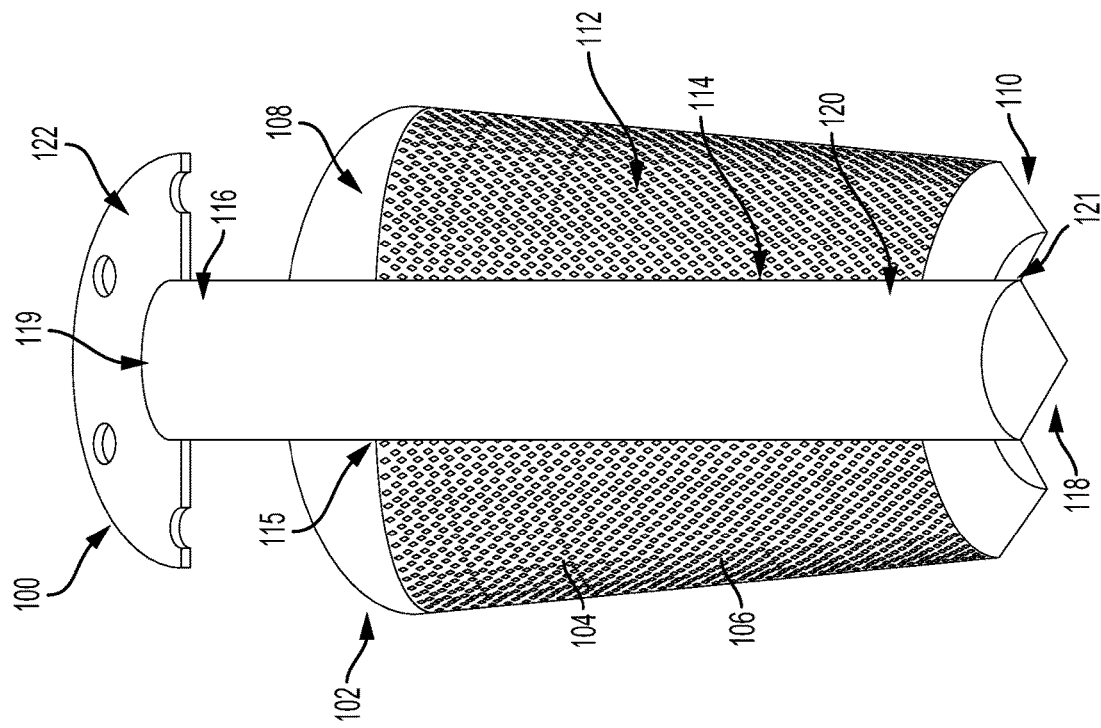
FIG. 2 is a cross-sectional illustration of the apparatus, according to an example implementation.

FIG. 2 is a cross-sectional view of the apparatus 100, according to an example implementation. The cross-sectional view of the apparatus 100 depicts the interiors of elements of the integral component 102, including interior views of the inner filter 114 and outer shell 104. The cross-sectional view of the apparatus 100 shows the various connections between the elements of the apparatus 100 that is possible through the use of Additive Manufacturing (AM).

The inner filter 114 is shown as intraconnected to the flange 122 and the outer shell 104 of the apparatus 100. In particular, the first end 116 of the inner filter 114 is deposited as connected to the flange 122 with the opening 119 of the inner filter 114 formed into a center portion of the flange 122. This configuration enables pressurant to directly enter into the inner filter 114 via the opening 119 sans any gaps between the flange 122 and the inner filter 114 to potentially leak.

In addition, the inner filter 114 is shown as intraconnected at the first end 108 and the second end 110 of the outer shell 104. As shown in FIG. 2, a portion of the inner filter 114 is connected to the first end 108 of the outer shell 104 at the opening 115 of the first end 108 and the second end 118 of the inner filter 114 is intraconnected with the second end 110 of the outer shell 104. The second end 118 of the inner filter 114 has a pointed, cone-like, closed-end configuration that extends as an intraconnected peak into the second end 110 of the outer shell 104. As such, a groove 121 in the second end 110 of the outer shell 104 and the peak formed at the second end 118 of the inner filter 114 can assist in directing pressurant out of the holes 120 in the inner filter 114 at an upward angle radially outward from the apparatus 100.

In some examples, the second end 110 of the outer shell 104 and the second 118 of the inner filter 114 can form discontinuous angled surfaces, such as a conic surface angled away from the first end 108 of the outer shell 104 with the groove 121 in the second end 110 extending around the conic surface. The discontinuous angled surfaces formed by the second end 110 and the second end 118 can further include an inverted conic surface that is angled back towards the first end of the outer shell 104, and a conic surface that encloses the second end 118 of the inner filter 114. The different conic surfaces formed by the second end 110 and the second end 118 can direct pressurant flow upward and away from liquid propellant positioned within a tank.

Figure 3:
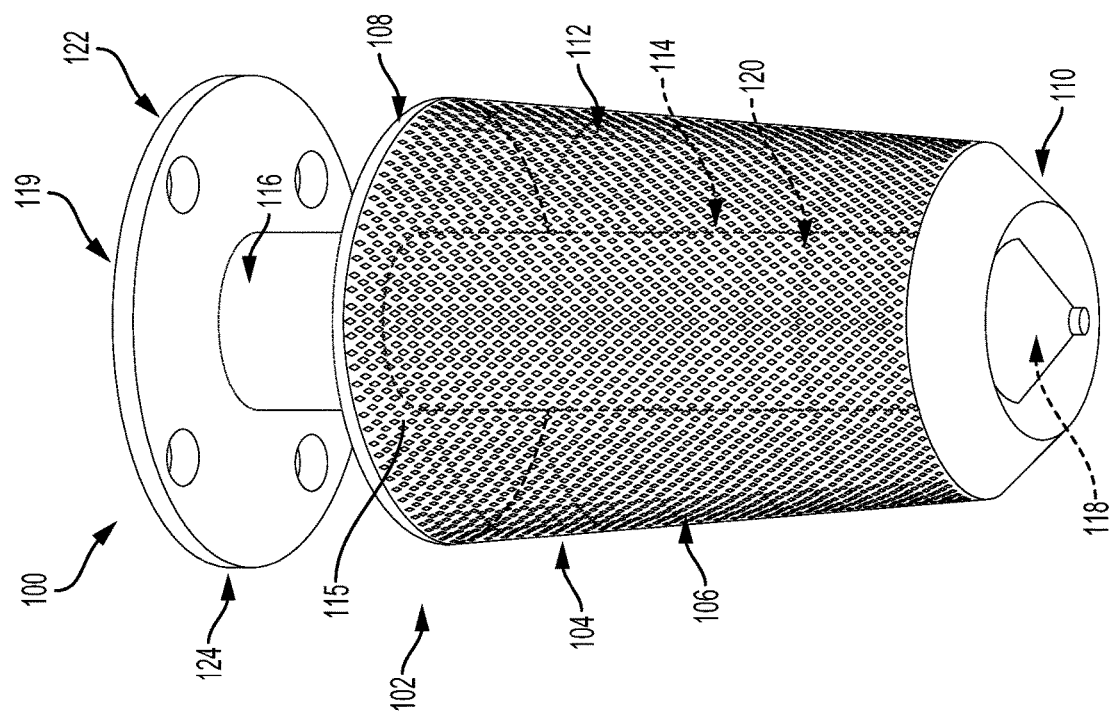
FIG. 3 is another illustration of the apparatus, according to an example implementation.

FIG. 3 is another illustration of the apparatus 100, according to an example implementation. In particular, the integral component 102 of the apparatus 100 is shown as having a seal 124 coupled to the flange 122. The seal 124 is positioned within a groove extending into an outward/mating face of the flange 122 (e.g., a face of the flange 122). The flange face is configurable to mate with the tank such that the seal 124 extends around a perimeter of the flange and prevents received pressurant from leaking out of the opening 119 at the first end 116 of the inner filter 114. The seal 124 can also prevent fluid from entering into a tank via the opening of the tank. The size and configuration of the seal 124 can vary within examples. For instance, the seal 124 can have a pentagonal shape that includes four faces and an opening.

In addition, FIG. 3 further shows a foundation portion of the apparatus 100 formed by the second end 118 of the inner filter 114 and the second end 110 of the outer shell 104 can have a configuration that assists in directing pressurant diffused from the apparatus 100. In particular, the second end 118 of the inner filter 114 extends into an angled groove formed in the second end 110 of the outer shell 104 such that the angled groove closes the second end 118 of the inner filter 114 and prevents received pressurant from leaking out of the inner filter 114 at the second end 110 of the inner filter 114. As such, the second end 118 of the inner filter 114 is generated as a portion of the second end 110 of the outer shell 104 using a layer-upon-layer generation process.

The configuration formed in the foundation portion of the apparatus 100 can help direct pressurant diffused from the inner filter 114 and out the holes 112 of the outer shell 104 upward from the apparatus 100. Particularly, the angled groove formed in the second end 110 of the outer shell 104 can enable pressurant diffused through the holes 120 in the inner filter 104 to flow radially out and upward toward the first end 108 of the outer shell 104. The second end 110 of the outer shell 104 and the second end 118 of the inner filter 114 combine to form a continuous enclosure surface for the apparatus 100, preventing pressurant from flowing out of the end of apparatus 100 opposite first end 108.

In some examples, the second end 118 of the inner filter 114 is generated as a portion of the second end 110 of the outer shell 104 using the layer-upon-layer generation process of Additive Manufacturing (AM). This configuration differs from the foundation portions of diffusers made out of multiple components because the inner filter and the foundation portion of the outer shell of multiple-component diffusers are typically separate components fastened together, which can result in a diversity of tolerances and, therefore, an imperfect union.

Figure 4:
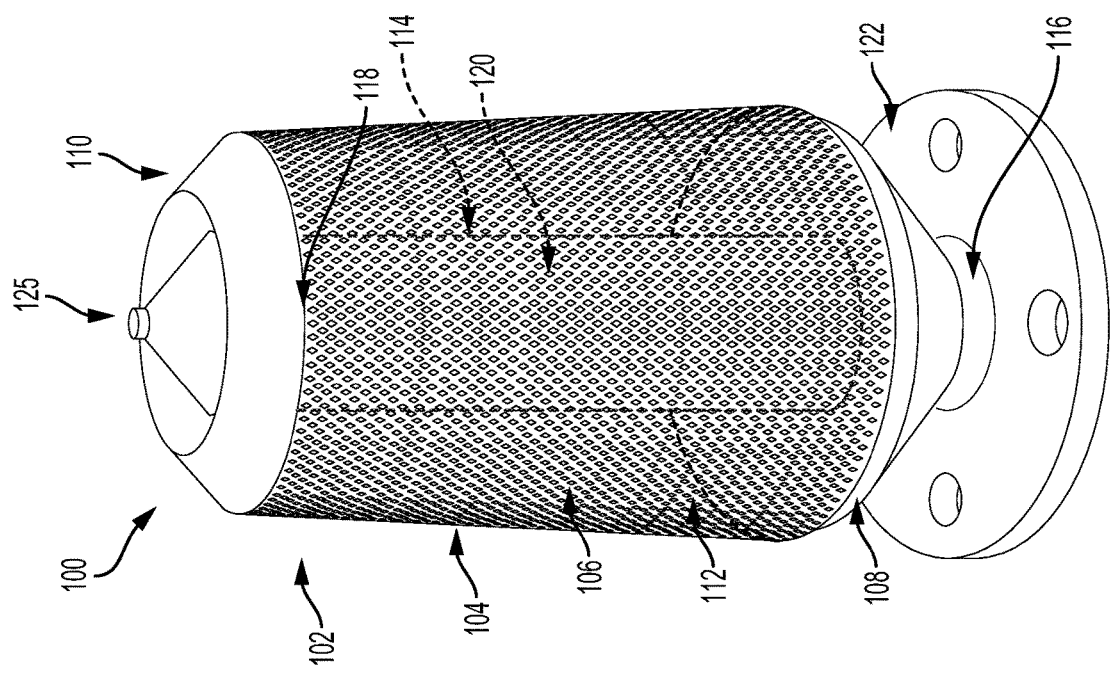
FIG. 4 is an additional illustration of the apparatus, according to an example implementation.

FIG. 4 is an additional illustration of the apparatus 100, according to an example implementation. The apparatus 100 is shown coupled to another apparatus and includes the integral component 102 involving various elements intraconnected as a single-piece structure. Particularly, the integral component 102 includes the outer shell 104 configured with the shell surface 106 positioned between the first end 108 and the second end 110. The shell surface 106 of the outer shell 104 includes holes 112 that are each shaped in a diamond configuration. The holes 112 are arranged in a radial, extrude-cut pattern across the shell surface 105, but can have non-uniform layouts within other example implementations.

The integral component 102 further includes the inner filter 114 positioned inside the outer shell 104 such that pressurant can diffuse from the pin-shaped, parallelogram-shaped, trapezoidal-shaped, trapezium-shaped, or micro-diamond shaped holes 120 extending along the inner filter 114 and subsequently through the holes 112 in the shell surface 106 of the outer shell 104. The inner filter 114 includes the first end 116 extending through the opening 115 in the first end 108 of the outer shell 104. The first end 116 of the inner filter 114 also forms a connection with the flange 122 and includes the opening 119 for receiving pressurant for the apparatus 100 to passively diffuse the pressurant, and heat, in a desired pattern (e.g., towards one or more inner sidewalls of a tank). The inner filter 114 also includes the second end 118 intraconnected with the second end 110 of the outer shell 104 as aforementioned.

The second end 110 of the outer shell 104 is further shown with a tip 125. The tip 125 can be used to mount an accelerometer or other sensing equipment (e.g., heater, cooler, laser source) to test the performance of the apparatus 100. The performance test can enable further design changes in subsequent production of the apparatus 100. The tip 125 can also provide a flat face for insertion of diagnostic equipment or a surface for machining a hole to further manipulate performance of the apparatus 100. The tip 125 may include a diamond-shaped pilot hole. The tip 125 may be manufactured during the build or after the build on any flat or non-flat surface.

The flange 122 of the integral component 102 includes slots that enable the apparatus 100 to be coupled to another apparatus via use of fasteners (i.e., screws). In other examples, Additive Manufacturing (AM) can enable the flange 122 to be deposited as a portion of the other apparatus (e.g., an extension within a tank) such that the apparatus 100 and the other apparatus form a single-piece structure without requiring any assembly.

Figure 5:
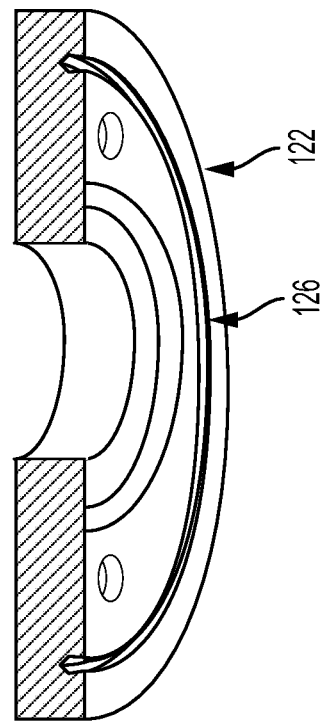
FIG. 5 is an illustration of the flange of the apparatus, according to an example implementation.

FIG. 5 is an illustration of the flange 122 of the apparatus 100, according to an example implementation. The flange 122 is shown with a Gibbous O-ring Layering (GOL) or snapping o-ring land 126 configured as a pentagonal shape that can avoid a vertical overhang. For example, the angle of the sloped roof can be 53-55 degrees from the horizon, which is within range of the Additive Manufacturing (AM) depositional limits. In some instances, the snapping o-ring land 126 further incorporates fillets to eliminate stress-fracture promulgation. In some cases, there are also fillets at the clamping edges to mitigate wear on the snapping o-ring land 126.

Figure 6:
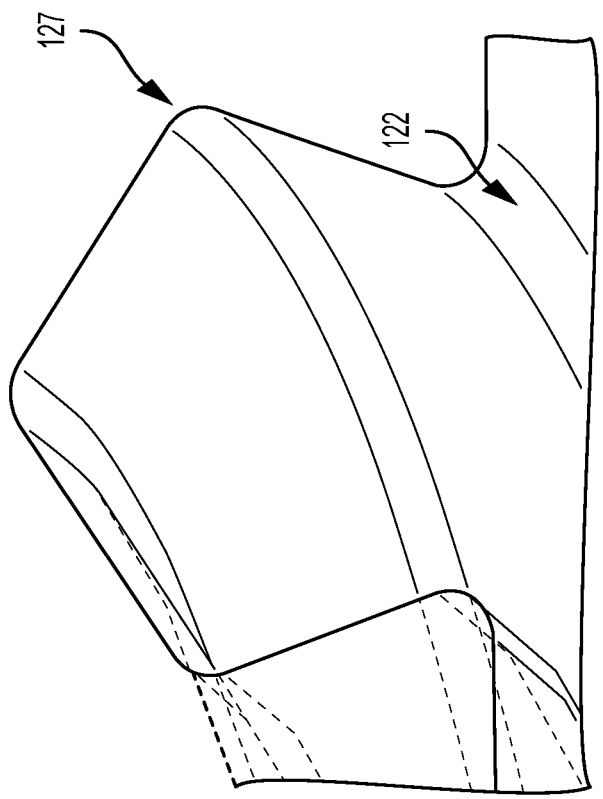
FIG. 6 is another illustration of the flange of the apparatus, according to an example implementation.

FIG. 6 is another illustration of the flange 122 of the apparatus 100, according to an example implementation. The Gibbous O-ring Layering (GOL) 127 can be embedded in implementations with use of pentagonal shaping. As discussed above, the Gibbous O-ring Layering 127 is one example of geometry for securing an o-ring on any AM sealing surface which may disengage.

Figure 7:
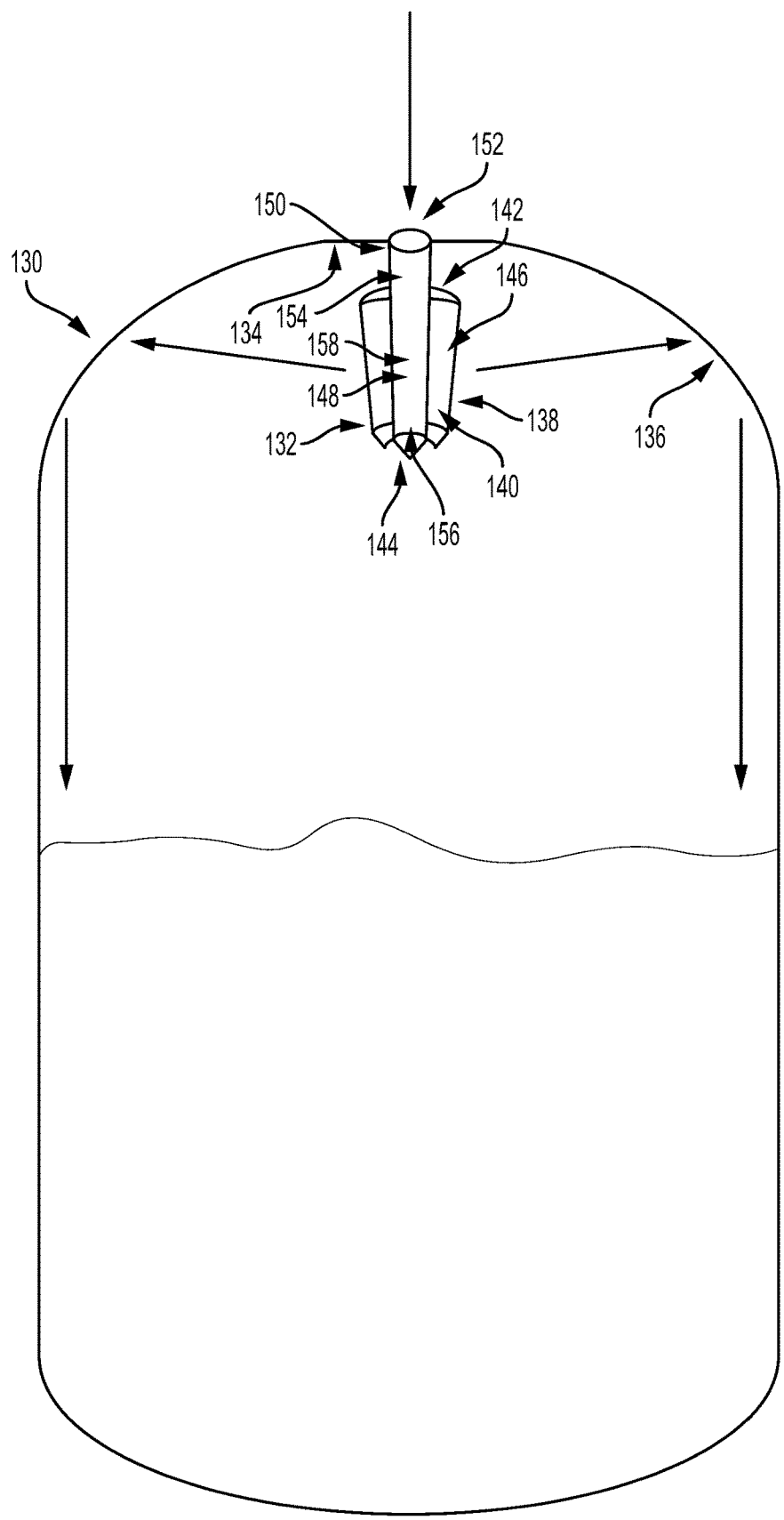
FIG. 7 is an illustration of a tank configured with an integral component, according to an example implementation.

FIG. 7 is a conceptual illustration of a tank 130, according to an example implementation. The tank 130 includes an integral component 132 extending toward a center of the tank 130 from an inner surface 134 of the tank 130. Additional configurations are possible.

The integral component 132 is shown as a part of the tank 130. Particularly, Additive Manufacturing (AM) or a similar process can generate the tank to include the integral component 132 in a single-piece intraconnected structure. For example, Additive Manufacturing (AM) can deposit the tank 130 using a blend of aluminum lithium powder. Similar to the integral component 102 of FIGS. 1-2, the integral component 132 is configurable for passively receiving and diffusing pressurant towards one or more inner surfaces 136 (e.g., sidewalls, ceiling) of the tank.

As shown in FIG. 7, the integral component 132 includes an outer shell 138 configured with a shell surface 140 positioned between a first end 142 and a second end 144. The second end 144 of the outer shell 138 has a smaller diameter than the diameter of the first end 142 of the outer shell 138 causing the outer shell 138 to have a frustum configuration. In other examples, however, the outer shell 138 can have other configurations, such as a bell pepper, complex curves, or cylindrical shape (using "cylindrical" in both layman's terms or the mathematical lexicon). The shell surface 140 can include a first plurality of holes 146 with the holes 146 having diamond configurations.

In other implementations, the holes 146 can have other shapes and layouts in the shell surface 140. For example, one or more portions of the shell surface 140 can lack holes 146 such that the integral component 132 diffuses pressurant in a desired manner.

Positioned inside the outer shell 138 is an inner filter 148 that operates similarly to the inner filter 114 described above. Inner filter is generally co-axial with the outer shell. In other examples, the two structures are not co-axial, and in others, only portions are co-axial. The first end 150 of the inner filter 148 extends through an opening 154 in the first end 142 of the outer shell 138 and includes an opening 152 that is in pressurant communication with an opening of the tank 130. The inner filter 148 also includes a second end 156 that is coupled to the second end 144 of the outer shell 138. In particular, the second end 156 of the inner filter 148 is shown as a closed end such that pressurant cannot diffuse directly through the second end 156.

The inner filter 148 includes a second plurality of holes 158 positioned between the first end 150 and the second end 156 of the inner filter 148 such that pressurant received via the opening 152 at the first end 150 of the inner filter 148 diffuses through the second plurality of holes 158. After diffusing through the holes 158 in the inner filter 148, the pressurant can further diffuse through the holes 146 in the shell surface 140 of the outer shell 138 in a manner that directs the pressurant away from the liquid propellant surface towards inner sidewalls walls of the tank 130. This configuration enables the integral component 132 to diffuse pressurant away from the liquid propellant surface upward towards the first end 142 of the outer shell 138 and radially outward toward the sides of the tank to mitigate chaotic mixing of the pressurant with propellant(s) already positioned within the tank 130. As such, the integral component 132, including the size and shape of elements, positions of holes in the shell surface 140 and inner filter, and other parameters can alter the dispersion paths of pressurant from the integral component 132 into the tank 130.

Figure 8:
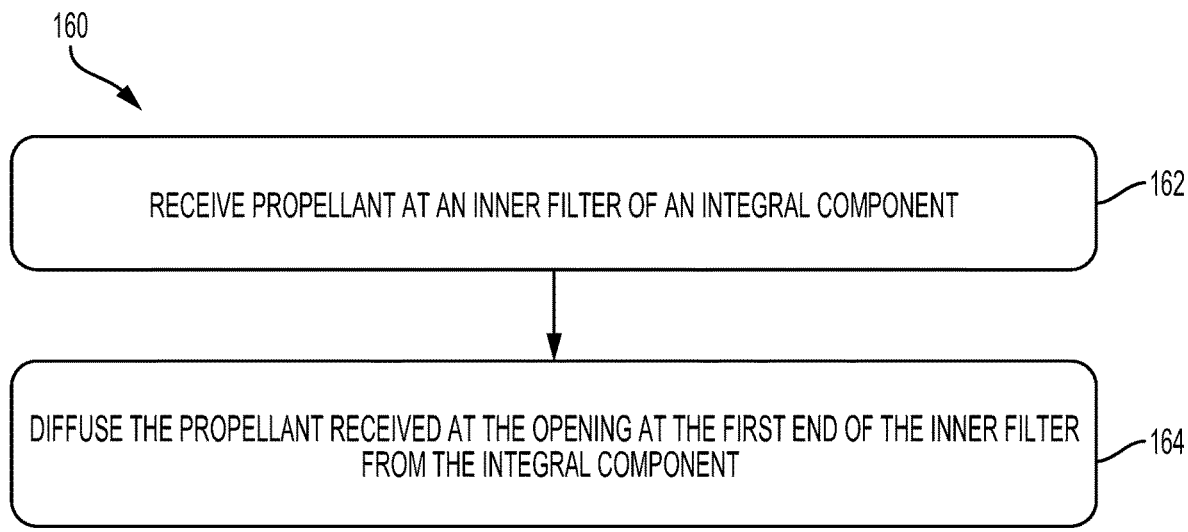
FIG. 8 shows a flowchart of an example method of passively receiving and diffusing pressurant.

FIG. 8 shows a flowchart of an exemplary method of receiving and diffusing pressurant within a pressurant tank, according to an example implementation. Method 160 shown in FIG. 8 presents an example of a method that could be used with the apparatus 100 shown in FIGS. 1-6 or the tank shown in FIG. 7. In other examples, components of the devices and/or systems may be arranged to be adapted to, capable of, or suited for performing the functions, when operated in a specific manner.

Method 160 may include one or more operations, functions, or actions as illustrated by one or more of blocks 162 and 164. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 162, the method 160 involves receiving pressurant at an inner filter of an integral component. The pressurant is received via an opening at a first end of the inner filter. As such, the integral component is configurable for receiving and diffusing the pressurant, and includes an outer shell positioned around the inner filter. Particularly, the outer shell includes a shell surface configured with a first plurality of holes positioned between a first end and a second end of the outer shell.

At block 164, the method 160 involves diffusing the pressurant received at the opening at the first end of the inner filter from the integral component. In particular, diffusing the pressurant from the integral component includes initially diffusing the pressurant from the inner filter through a second plurality of holes positioned in the inner filter between the first end and a second end of the inner filter, and subsequently diffusing the pressurant through the first plurality of holes in the shell surface of the outer shell.

Figure 9:
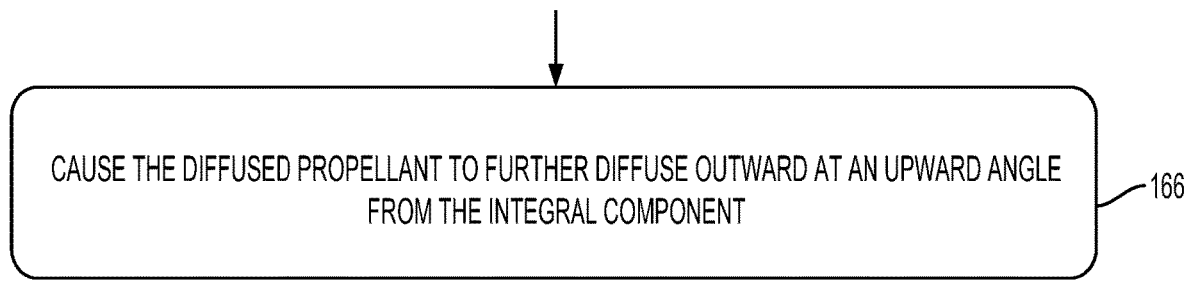
FIG. 9 shows a flowchart of an example method for use with the method shown in FIG. 8, according to an example implementation.

FIG. 9 shows a flowchart of an example method for use with the method 160, according to an example implementation. At block 166, functions include causing the diffused pressurant to further diffuse outward at an upward angle from the integral component. For instance, causing the diffused pressurant to further diffuse outward at the upward angle from the integral component can involve using one or more of a lip extending around a perimeter of the second end of the outer shell, a conic surface angled away from the first end of outer shell formed by the second end of the inner filter and the second end of the outer shell, and a frustum configuration formed by the outer shell.

By the term "substantially" or "about" used herein, it is meant that the recited characteristic, parameter, or value need not be achieved exactly, but that deviations or variations, including for example, measurement error, measurement accuracy limitations and other factors known to a person having ordinary skill in the art, may occur in amounts that do not preclude and/or occlude the effect the characteristic was intended to provide.

The description of the different advantageous arrangements has been presented for the purposes of illustration and description, and is not intended to be exhaustive or limited to the examples in the disclosed form. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising:
an integral component configurable for receiving and diffusing pressurant, wherein the integral component comprises:
an outer shell having a shell surface positioned between a first end and a second end, wherein the shell surface includes a first plurality of holes;
an inner filter positioned inside the outer shell, wherein a first end of the inner filter extends through an opening in the first end of the outer shell and includes an opening for receiving pressurant, wherein a second end of the inner filter is coupled to the second end of the outer shell, wherein the inner filter includes a second plurality of holes positioned between the first end and the second end of the inner filter such that pressurant received via the opening at the first end of the inner filter diffuses through the second plurality of holes and subsequently through the first plurality of holes in the shell surface of the outer shell, wherein respective holes in the first plurality of holes in the shell surface of the outer shell are larger than respective holes in the second plurality of holes in the inner filter, and wherein the first end of the outer shell has a greater circumference than the second end of the outer shell such that the outer shell has a frustum configuration; and
a flange coupled to the first end of the inner filter, wherein the flange is configurable for coupling the apparatus such that the opening at the first end of the inner filter is in pressurant communication with a pressurant source.

2. The apparatus of claim 1, wherein one or more portions of the shell surface of the outer shell lacks respective holes of the first plurality of holes.

3. The apparatus of claim 1, wherein one or more holes in the first plurality of holes in the shell surface of the outer shell has a diamond configuration.

4. The apparatus of claim 1, wherein one or more holes in the first plurality of holes in the shell surface of the outer shell has a teardrop configuration.

5. The apparatus of claim 1, wherein the integral component further comprises:
a seal coupled to the flange, wherein the seal is positioned within a groove extending into a face of the flange such that the seal extends around a perimeter of the flange and prevents received pressurant from leaking out of the opening at the first end of the inner filter.

6. The apparatus of claim 1, wherein the second end of the inner filter extends into an angled groove formed in the second end of the outer shell such that the angled groove closes the second end of the inner filter and prevents received pressurant from leaking out of the inner filter at the second end of the inner filter.

7. The apparatus of claim 6, wherein the angled groove formed in the second end of the outer shell enables pressurant diffused through the second plurality of holes in the inner filter to flow radially out and upward toward the first end of the outer shell.

8. The apparatus of claim 6, wherein the second end of the inner filter is generated as a portion of the second end of the outer shell using a layer-upon-layer generation process.

9. The apparatus of claim 1, wherein a cross-sectional area of the inner filter is based on preventing choked flow conditions for the integral component, and wherein a distance between the inner filter and the outer shell is based on a mass flow rate for the integral component.

10. The apparatus of claim 1, wherein a length between the first end of the inner filter and the second end of the inner filter is based on a mass flow rate for the integral component.

11. The apparatus of claim 1, wherein the integral component is made out of nickel-chromium-based super alloy.

12. A tank comprising;
an integral component extending toward a center of the tank from an inner surface of the tank, wherein the integral component is configurable for receiving and diffusing pressurant, and wherein the integral component comprises:
an outer shell having a shell surface positioned between a first end and a second end, wherein the shell surface includes a first plurality of holes;
an inner filter positioned inside the outer shell, wherein a first end of the inner filter extends through an opening in the first end of the outer shell and includes an opening that is in pressurant communication with an opening of the tank, wherein a second end of the inner filter is coupled to the second end of the outer shell, wherein the inner filter includes a second plurality of holes positioned between the first end and the second end such that pressurant received via the opening at the first end of the inner filter diffuses through the second plurality of holes and subsequently through the first plurality of holes in the shell surface of the outer shell, wherein respective holes in the first plurality of holes in the shell surface of the outer shell are larger than respective holes in the second plurality of holes in the inner filter, and wherein a length between the first end of the inner filter and the second end of the inner filter is based on a mass flow rate for the integral component.

13. The tank of claim 12, wherein the integral component is positioned inside the tank such that the pressurant received via the opening at the first end of the inner filter that diffuses through the second plurality of holes and subsequently through the first plurality of holes in the shell surface of the outer shell and further diffuses away from a liquid propellant surface toward one or more inner walls of the tank proximate the opening of the tank.

14. The tank of claim 12, wherein the first end of the outer shell has a greater circumference than the second end of the outer shell such that the outer shell has a frustum configuration.

15. The tank of claim 12, wherein the first plurality of holes are based on a sub-sonic flow equation, and wherein the second plurality of holes are positioned between the first end of the outer shell and the second end of the inner filter.

16. The tank of claim 12, wherein the second end of the outer shell further includes a lip extending around a perimeter of the second end such that the pressurant received via the opening at the first end of the inner filter that diffuses through the second plurality of holes and subsequently through the first plurality of holes in the shell surface of the outer shell and further diffuses outward at an upward angle from the integral component toward one or more inner walls of the tank proximate the opening of the tank.

17. The tank of claim 12, wherein one or more portions of the shell surface of the outer shell lacks respective holes of the first plurality of holes.

18. The tank of claim 12, wherein one or more holes in the first plurality of holes in the shell surface of the outer shell has a diamond configuration.

19. The tank of claim 12, wherein one or more holes in the first plurality of holes in the shell surface of the outer shell has a teardrop configuration.

20. The tank of claim 12, wherein the second end of the inner filter extends into an angled groove formed in the second end of the outer shell such that the angled groove closes the second end of the inner filter and prevents received pressurant from leaking out of the inner filter at the second end of the inner filter.

\* \* \* \* \*